US010394797B2

(12) United States Patent
Seo

(10) Patent No.: US 10,394,797 B2
(45) Date of Patent: Aug. 27, 2019

(54) METHOD AND COMPUTING APPARATUS FOR MANAGING MAIN MEMORY DATABASE

(71) Applicant: TmaxData Co., Ltd, Gyeonggi-Do (KR)

(72) Inventor: Se Hoon Seo, Seoul (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 522 days.

(21) Appl. No.: 15/085,871

(22) Filed: Mar. 30, 2016

(65) Prior Publication Data

US 2017/0262489 A1    Sep. 14, 2017

(30) Foreign Application Priority Data

Mar. 10, 2016   (KR) .................. 10-2016-0028676

(51) Int. Cl.
*G06F 17/30* (2006.01)
*G06F 7/00* (2006.01)
*G06F 16/23* (2019.01)

(52) U.S. Cl.
CPC ...... *G06F 16/2365* (2019.01); *G06F 16/2379* (2019.01)

(58) Field of Classification Search
CPC .................. G06F 17/30371; G06F 17/30377
USPC ....................................................... 707/693
See application file for complete search history.

(56) References Cited

U.S. PATENT DOCUMENTS

| 6,088,694 | A | * | 7/2000 | Burns | ................. G06F 11/1451 707/999.009 |
| 6,125,371 | A | * | 9/2000 | Bohannon | ......... G06F 17/30309 707/695 |
| 6,457,021 | B1 | | 9/2002 | Berkowitz et al. | |
| 7,533,228 | B1 | * | 5/2009 | Garthwaite | ........... G06F 12/023 711/159 |

(Continued)

FOREIGN PATENT DOCUMENTS

| KR | 10-2002-0030223 | 4/2002 |
| KR | 10-2006-0085899 | 7/2006 |

(Continued)

OTHER PUBLICATIONS

Korean Office Action issued in co-pending KR Patent Application No. 10-2016-0028676, dated Dec. 9, 2016, (6 pgs) with English translation of same (3 pgs).

*Primary Examiner* — Pavan Mamillapalli
(74) *Attorney, Agent, or Firm* — Rutan & Tucker, LLP

(57) ABSTRACT

An exemplary embodiment of the present disclosure discloses a management method of a main memory database which is performed in a computing apparatus including one or more processors and a main memory which stores commands executable in the processors. The management method of the main memory database includes: generating a first log including information of change, which includes at least one of a data insert, an update, and a deletion of data recorded in the main memory, in the main memory; recording the first log in a permanent storing device to generate a first log file; and performing log compaction on the first log to generate a second log including only effective change information among change information on data in order to reduce a size of the log.

12 Claims, 10 Drawing Sheets

(56) References Cited

U.S. PATENT DOCUMENTS

| | | | |
|---|---|---|---|
| 8,412,690 B2* | 4/2013 | Hermann | G06F 16/254 707/703 |
| 8,818,954 B1* | 8/2014 | Bergant | G06F 11/2074 707/645 |
| 8,977,597 B2 | 3/2015 | Ganesh et al. | |
| 9,213,728 B2* | 12/2015 | Engelko | G06F 16/23 |
| 9,519,676 B1* | 12/2016 | Finnie | G06F 16/2365 |
| 9,639,548 B2* | 5/2017 | Bawaskar | G06F 16/137 |
| 2002/0087500 A1 | 7/2002 | Berkowitz et al. | |
| 2003/0061245 A1* | 3/2003 | Soria, Jr. | G06F 17/30309 707/999.203 |
| 2008/0263114 A1 | 10/2008 | Nath et al. | |
| 2009/0037498 A1* | 2/2009 | Mukherjee | G06F 9/5005 |
| 2009/0222636 A1* | 9/2009 | Yano | G06F 12/0246 711/166 |
| 2010/0023805 A1* | 1/2010 | Colaiacomo | G06F 11/1438 714/15 |
| 2011/0252000 A1* | 10/2011 | Diaconu | G06F 17/30501 707/638 |
| 2012/0265743 A1* | 10/2012 | Ivanova | G06F 16/2379 707/702 |
| 2013/0346378 A1 | 12/2013 | Tsirogiannis et al. | |
| 2014/0025651 A1 | 1/2014 | Schreter | |
| 2014/0067767 A1 | 3/2014 | Ganesh et al. | |
| 2014/0172803 A1* | 6/2014 | Diaconu | G06F 17/30088 707/649 |
| 2015/0058556 A1* | 2/2015 | Hamedani | G06F 3/0655 711/114 |
| 2015/0149704 A1* | 5/2015 | Lee | G06F 17/30368 711/103 |
| 2015/0186266 A1 | 7/2015 | Schreter | |

FOREIGN PATENT DOCUMENTS

| | | |
|---|---|---|
| KR | 1020110014413 | 2/2011 |
| KR | 1020110138946 | 12/2011 |
| KR | 1020120118550 | 10/2012 |
| KR | 10-2015-0123136 | 11/2015 |

* cited by examiner

FIG. 4

| Data2=$x_1$ | Data1=$w_1$ | Data3=$y_1$ | Data4=$z_1$ | Data2=$x_2$ | Data1=$w_2$ |
|---|---|---|---|---|---|
| Data4=$z_2$ | Data4=$z_3$ | Data2=Delete | | | |

METHOD AND COMPUTING APPARATUS FOR MANAGING MAIN MEMORY DATABASE

RELATED APPLICATIONS

This application is related to and claims the benefit under 35 USC § 119 of Korean Application KR 10-2016-0028676 titled "METHOD AND COMPUTING APPARATUS FOR MANAGING MAIN MEMORY DATABASE" filed Mar. 10, 2016, which is incorporated herein by reference in its entirety.

TECHNICAL FIELD

The present disclosure relates to a database, and more particularly, to a log management method of a main memory database.

BACKGROUND ART

A database is classified into a main memory database and a disk database, depending on a main storage location of data. The main memory database locates data on a main memory to minimize disk input/output (I/O), thereby showing a higher performance than that of the disk database.

A main object of the database is to store data and there are several solutions to cope with loss of data. A representative solution is to back up data. However, when data is backed up, lots of data needs to be read and rewritten, so that lots of I/O is generated, which may lower a performance.

Further, in order to store the data, there is a solution which generates a data change history as a log to store the log as a separate file. When data is lost, the data may be restored through a log including a data change history. According to a solution which copes with the data loss through the log, the log is generated whenever the data is changed, so that the I/O generated at one time is not so large. However, since the log includes all change histories of data, in the database in which data is frequently changed, a log size is indefinitely increased. In order to store the data, the data backup and the log generating solution may be combined to be used.

Accordingly, there may be a demand for a method which appropriately reduces the log size in this technical field.

U.S. Pat. No. 8,977,597 discloses a method of generating a redo record before committing a transaction.

SUMMARY OF THE INVENTION

The present disclosure has been made in an effort to provide a solution for preventing data loss of a database through a log.

An exemplary embodiment of the present disclosure provides a management method of a main memory database which is performed in a computing apparatus including one or more processors and a main memory which stores commands executable in the processors. The management method of a main memory database includes: generating a first log including information of change—which includes at least one of data insert, update, and delete—of data recorded in the main memory, in the main memory; recording the first log in a permanent storing device to generate a first log file; and performing log compaction on the first log to generate a second log including only effective change information among change information on data in order to reduce a size of the log.

Alternatively, the method may further include determining whether a predetermined condition is satisfied to perform log compaction in order to reduce a size of the log, and the predetermined condition may include at least one of whether a user request is received, whether a predetermined period has elapsed, whether the size of the log file is equal to or larger than a predetermined size, and whether a usage amount of the processor is equal to or lower than a predetermined usage amount.

Alternatively, the permanent storing device of the main memory database may include a log file, but may not include a data file.

Alternatively, the data may be configured by one or more versions which are connected by a link and generate a version chain, based on a modified time sequence.

Alternatively, the method may further include recording the second log in the permanent storing device to generate a second log file; and deleting the first log file from the permanent storing device.

Alternatively, the performing of log compaction on the first log to generate a second log including only effective change information among change information on individual data may include: reading change information of the first log file to identify data; and determining that change information which matches the latest version of the identified data among the change information on the identified data in the first log file as the effective change information.

Alternatively, the reading of change information of the first log file to identify data may include: identifying data corresponding to change information of a predetermined time limit among the change information included in the first log file.

Alternatively, the performing of log compaction on the first log to generate a second log including only effective change information among change information on individual data may include: comparing a time stamp of the change information and a time stamp of the latest version of the data to determine the change information having a time stamp earlier than the time stamp of the latest version of the data as invalid change information; and comparing a time stamp of the change information and a time stamp of the latest version of the data to determine the change information having a time stamp after the time stamp of the latest version of the data as effective change information.

Alternatively, the performing of log compaction on the first log to generate a second log including only effective change information among change information on individual data may include: scanning the main memory to identify the data; reading a latest version of the identified data; and generating a second log including the latest version of the data.

Alternatively, the method may further include generating changed data identification information including information for identifying changed data when data is changed and the performing of log compaction on the first log to generate a second log including only effective change information among change information on individual data may include: scanning the changed data identification information to identify changed data; reading a latest version of the identified data; and generating a second log including the latest version of the data.

Alternatively, the method may further include generating block data change information which identifies changed data when the data is changed in a data block header of the main memory, in which the main memory includes two or more data blocks, the performing of log compaction on the log to generate a second log including only effective change information among change information on individual data may include: scanning each data block header of the main memory to read block data change information and determine whether the block data change information indicates the change of data included in each data block; scanning the data block to identify changed data when the block data change information indicates change of data included in the data block as a result of determination; reading a latest version of the identified data; and generating a second log including the latest version of the data.

Another exemplary embodiment of the present disclosure discloses a computing apparatus including a main memory database. The computing apparatus includes one or more processors; and a main memory which stores commands executable by the processors, and the one or more processors may include: a log generating module which generates a first log including information of change—which includes at least one of data insert, update, and delete—of data recorded in the main memory, in the main memory; a log file generating module which records the first log in a permanent storing device to generate a first log file; and a log compaction module which performs log compaction on the first log to generate a second log including only effective change information among change information on data in order to reduce a size of the log.

Another exemplary embodiment of the present disclosure discloses a computer program which includes a plurality of commands executed by one or more processors and is stored in a computer readable medium. The computer program may include:

a command for generating a first log including information of change—which includes at least one of data insert, update, and delete—of data recorded in the main memory, in the main memory; a command for recording the first log in a permanent storing device to generate a first log file; and a command for performing log compaction on the first log to generate a second log including only effective change information among change information on data in order to reduce a size of the log.

The present disclosure provides a solution for preventing a data loss of a database through a log.

BRIEF DESCRIPTION OF THE DRAWINGS

Various aspects will be described with reference to the drawings and like reference numerals collectively designate like elements. In the following exemplary embodiments, a plurality of specific details will be suggested for more understanding of one or more aspects for the purpose of description. However, it will be apparent that the aspect(s) will be embodied without having the specific details. In other examples, known structures and devices will be illustrated as a block diagram to easily describe the one or more aspects.

FIG. 4 is a view illustrating an example of a log of the plurality of data including the plurality of versions illustrated in FIG. 3.

DETAILED DESCRIPTION

Figure 1:
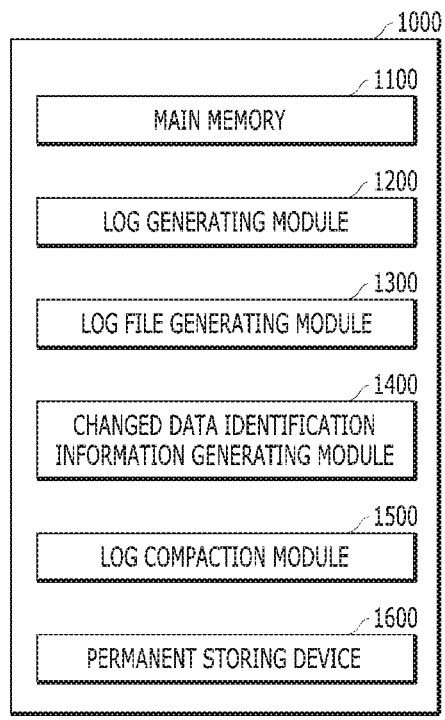
FIG. 1 illustrates a block diagram of a computing apparatus including a main memory database according to an exemplary embodiment of the present disclosure.

Various exemplary embodiments will be described with reference to the drawings and like reference numerals denote like components throughout the drawings. In the specification, various descriptions are suggested to provide understanding of the present disclosure. However, it is obvious that the exemplary embodiments may be embodied without having the specific description. In other examples, known structures and devices are provided as a block diagram to easily describe the exemplary embodiments.

Terminologies "component", "module", or "system" used in the specification indicate a computer-related entity, hardware, firmware, software, a combination of software and hardware, or execution of software. For example, a component may be a processing step which is executed in a processor, a processor, an object, an execution thread, a program and/or a computer, but is not limited thereto. For example, both an application which is executed in a computing apparatus and a computing apparatus may be a component. One or more components may be stayed in a processor and/or an executing thread, one component may be localized in one computer or distributed between two or more computers. Such components may be executed from various computer readable media having various data structures stored therein. The components may communicate with each other through local and/or remote processing in accordance with a signal including one or more data packets (for example, data through other system and a network, such as an Internet, through data and/or a signal from one component which interacts with other component in a local system or a distributed system).

Description of the suggested exemplary embodiments is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but interpreted in a broadest range which is consistent with principles suggested herein and new features.

FIG. 1 illustrates a block diagram of a computing apparatus including a main memory database according to an exemplary embodiment of the present disclosure.

A computing apparatus 1000 according to an exemplary embodiment of the present disclosure may include a computing apparatus which accepts connection of a plurality of clients such as a server, a main frame computer, or a work station.

The computing apparatus 1000 according to an exemplary embodiment of the present disclosure may include one or more processors, a main memory 1100, and a permanent storing device 1600. The one or more processors include a log generating module 1200, a log file generating module 1300, a log compaction module 1500, a changed data identification information generating module 1400.

The main memory 1100 according to an exemplary embodiment of the present disclosure includes a database. The database is configured by a data table including columns and rows and stores data. The data may refer to a specific column and row of the data table of the database. The main memory database may include data having one or more versions. Data may include one or more versions. The one or more versions are linked to generate a version chain and represent data. When data included in the database is changed, a new version for the data is generated and the new version is linked to a previous version to reflect the change of the data in the database. When the data recorded in the database is read, data corresponding to a transaction is read (for example, a version after a specific time stamp is read or the latest version is read) in accordance with a link of the version chain of the data.

Figure 2:
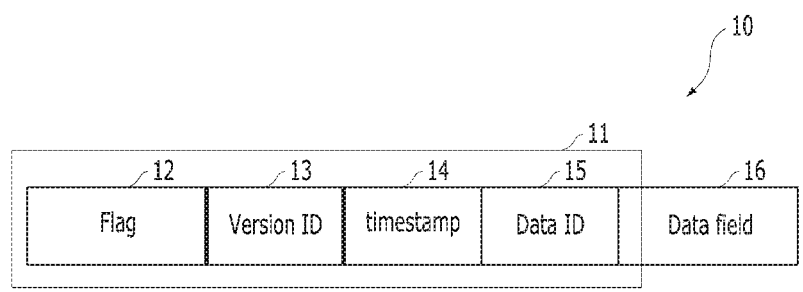
FIG. 2 is a view illustrating an example of a configuration of a version of data according to an exemplary embodiment of the present disclosure.

Referring to FIG. 2, a version 10 of the data according to an exemplary embodiment of the present disclosure may include a header 11 and a data field 16. The header 11 includes at least one of a flag 12 which represents a usage state of the version, version identification information 13 which identifies the version, a time stamp 14, and data identification information 15 which identifies data.

The flag 12 indicates a usage state of the version or whether the version is deleted. The flag 12 indicates that the current version is being recorded or read. When the flag indicates that the current version is being recorded, the corresponding version may not be read in response to a data request of the client. The database according to an exemplary embodiment of the present disclosure provides the flag 12 as described above to maintain data consistency even when a plurality of clients accesses the database.

The version identification information 13 may include information for identifying a version. The version identification information 13 may include information of an address value on a main memory of a next version of the data, information on whether next version data is present, and transaction information including the next version data. However, the above description is merely an example and the version identification information may include arbitrary information for identifying a current version and/or a next version of the data on the main memory.

The time stamp 14 includes information concerning a time when the version is recorded and information concerning a time of a transaction related with the version. The time stamp 14 may include a time stamp value at which the version is committed. The time stamp 14 may include a character string representing a time. The time stamp 14 may include arbitrary information related with the time for a version.

The data identification information 15 includes identification information indicating whether a value recorded in a data field is located in a specific column and row of the data table of the database. Therefore, the data identification information may include transaction identification information of the data. However, the above description is merely an example and the data identification information 15 may include arbitrary information for identifying a column and a row of the data table.

The data field 16 may include a data value. The data value may include an arbitrary type of character strings or numbers, or other arbitrary information.

The main memory 1100 stores versions 2000 of the data of the database, logs 3000 and 4000 which record change histories of the data table, changed data identification information 2100, and block data change information. The logs 3000 and 4000 may be configured by change information including changed contents of the data. Further, the main memory 1100 may include a plurality of data blocks. The data block may have an arbitrary size.

Further, the main memory 1100 is configured to store various types of data to support an operation of the computing apparatus 1000. The main memory 1100 may be implemented using an arbitrary type of volatile or non-volatile memory devices, such as a dynamic random access memory (DRAM), a static random access memory (SRAM), an electrically erasable programmable read only memory (EEPROM), an erasable programmable read only memory (EPROM), or a combination thereof.

The log generating module 1200 generates a log including change information for data recorded in the main memory 1100 in the main memory 1100. The change may include at least one of data insert, update, and delete. The log generating module 1200 generates the first log 3000 in the main memory 1100. The generated first log 3000 may be a target of the log compaction. The logs may be generated in the order of changed the entire data. For example, when data 1 is inserted as a and updated to be b in the database and then data 2 is inserted as c, the log includes a configuration which sequentially records the change of the database to be data 1: a (change information 1), data 1: b (change information 2), and data 2: c (change information 3). More detailed description will be provided below (see FIG. 4).

The log file generating module 1300 records the logs on the main memory 1100 in a permanent storing device 1600 to generate a log file. The log file generating module 1300 may record the logs in the permanent storing device to cope with the data loss well. The log according to an exemplary embodiment of the present disclosure may be a log located on the main memory 1100 and the log file may be a log located on the permanent storing device 1600. Further, when the database is frequently modified, a log size in the database may be continuously increased. A cost of the main memory 1100 is higher than the permanent storing device 1600 which is configured by a hard disk, so that when the log is recorded in a cheaper permanent storing device 1600 as a log file, economic feasibility of database management may be increased. Further, the file recorded in the permanent storing device 1600 is not lost even when a server is shut down, so that the log file generating module 1300 records the log on the main memory 1100 in the permanent storing device 1600 to generate the log file, thereby preventing the log from being lost. The log file generating module 1300 records a second log, which is generated as a result of performing log compaction by the log compaction module 1500, in the permanent storing device 1600 to generate a second log file and in this case, the first log file is deleted from the permanent storing device 1600.

The changed data identification information generating module 1400 generates changed data identification information 2100 including information for identifying which data is changed in the database. The changed data identification information includes information for identifying data which is updated or deleted in the database. The changed data identification information generating module 1400 may generate the changed data identification information 2100 in a separate space included in the main memory 1100. For example, the changed data identification information generating module 1400 generates a changed data identification information list 2100 for entire data in a separate space from the database 2000 and the logs 3000 and 4000.

The changed data identification information generating module 1400 may generate block data change information which identifies the change of data included in each data block of the main memory 1000, in the data block header. The main memory 1100 may include two or more data blocks. The changed data identification information and/or block data change information may be referred to identify updated or deleted data when the log compaction module 1500 performs the log compaction.

The log compaction module 1500 may perform the log compaction to reduce a size of the log. The log compaction module 1500 performs the log compaction for the first log to generate a second log including only effective change information among change information for every data. The log compaction module 1500 may perform the log compaction when a user request is received, a predetermined period has elapsed, the size of the log is equal to or larger than a predetermined size, a usage amount of the main memory 1100 is equal to or larger than a predetermined amount, and/or a usage amount of the processor is equal to or lower than a predetermined amount.

The log compaction module 1500 may perform the log compaction which leaves only effective change information among change information of the data included in the log and deletes the remaining information to reduce the size of the log. Further, the log compaction is also repeatedly performed on a log on which the log compaction has been performed.

The log compaction module 1500 reads the change information of the first log file to identify individual data. The log compaction module 1500 reads the change information included in the log file to identify which data is related with the change information. The log compaction module 1500 reads the entire change information of the first log file at one time to identify individual data or reads some of the first log file to identify individual data. The log compaction module 1500 may identify data corresponding to change information of a predetermined time limit among the change information included in the first log file. For example, the log compaction module 1500 may perform the log compaction only on change information for previous one hour among the change information included in the first log file. The log compaction module 1500 determines change information which matches the latest version of the identified data among the change information for the identified data as effective change information. When the data is updated, the log compaction module 1500 may determine the change information having a data value which matches the latest version data as effective change information. For example, when data 1 is inserted as a and updated to be b in the database and then data 2 is inserted as c, the log includes a configuration which sequentially records the change of the database to be data 1: a (change information 1), data 1: b (change information 2), and data 2: c (change information 3). In this case, since the data 1: b and the data 2: c have the data value which matches the latest version of the data, among the change information included in the log, the log compaction module 1500 determines the above data as effective change information. Further, the log compaction module 1500 generates a second log including only the data 1:b and the data 2: c, from which change information 1 is deleted. More detailed description will be provided below (see FIG. 5).

Further, the log compaction module 1500 compares a time stamp of the change information and a time stamp of the latest version of the data to determine change information having a time stamp earlier than the time stamp of the latest version of the data as invalid change information. The log compaction module 1500 compares a time stamp of the change information and a time stamp of the latest version of the data to determine change information having a time stamp which matches or is later than the time stamp of the latest version of the data as effective change information.

The log compaction module 1500 may perform the log compaction without reading the first log file. The log compaction module 1500 scans the main memory 1100 to identify individual data and reads latest versions of the individual identified data, and generates a second log including individual identified latest versions. The second log may include data values of the latest versions. The change information included in the second log may include the latest version of the data. More detailed description will be provided below (see FIG. 6).

Further, the log compaction module 1500 may not scan the entire main memory 1100, but scan changed data identification information to identify the changed data. As described above, the changed data identification information may include information for identifying which data is changed in the database. Therefore, the log compaction module 1500 scans the changed data identification information to confirm the changed data and reads the latest version only for the changed data along a version link, and maintains the change information of an existing log for data which is not changed after being inserted. The log compaction module 1500 scans only the changed data which is identified from the changed data identification information to include the latest version of the data in the second log. However, since with regard to the data which is not changed after being inserted, change information of the existing log is change information on the latest version, the second log is generated by including the change information of the existing log therein.

Further, the log compaction module 1500 may not scan the entire main memory 1100, but scan only a specific data lock through changed data identification information which is recorded in the data block header to identify the changed data. As described above, the changed data identification information may be included in the data block header and may include information indicating whether data is changed after inserting data which is stored in the data block. The log compaction module 1500 scans the data block header to read block data change information and determines whether the block data change information indicates that data included in each data block is changed. When the block data change information indicates that data included in each data block is changed, the log compaction module 1500 scans contents of the data block only for a specific data block in which data in the data block is changed after being inserted, to identify the changed data. The log compaction module 1500 retrieves a latest version of the data only for the identified data to be included in the log and allows the change information of the existing log for data which is not changed after being inserted to be included in the second log to generate the second log.

When the log compaction is performed in the database of the related art, invalid change information is deleted from the existing log, so that an empty space is generated in the log, which may cause fragmentation of the main memory or the permanent storing device. However, when the log compaction is performed according to an exemplary embodiment of the present disclosure, a log including only the effective changed information is newly generated, so that the fragmentation problem is not caused, thereby improving a performance. Further, when the log compaction is performed according to an exemplary embodiment of the present disclosure, the log compaction is divided to be performed, so that the performance lowering of the database at the time of log compaction may be minimized.

The permanent storing device 1600 stores the log file. The log file refers to a file in which a log generated on the main memory 1100 is stored in the permanent storing device 1600. The database according to an exemplary embodiment of the present disclosure does not include a data file, but only the log file on the permanent storing device 1600. The data file refers to a file in which a database on the main memory 1100 is stored in the permanent storing device 1600. The database according to the exemplary embodiment of the present disclosure does not generate the data file on the permanent storing device 1600, so that random I/O of the permanent storing device 1600 for the data file may be reduced. The permanent storing device 1600 may include storage media other than a main memory 1100 of the computing apparatus 1000 such as a hard disk drive (HDD) or a solid state drive (SSD).

Figure 3:
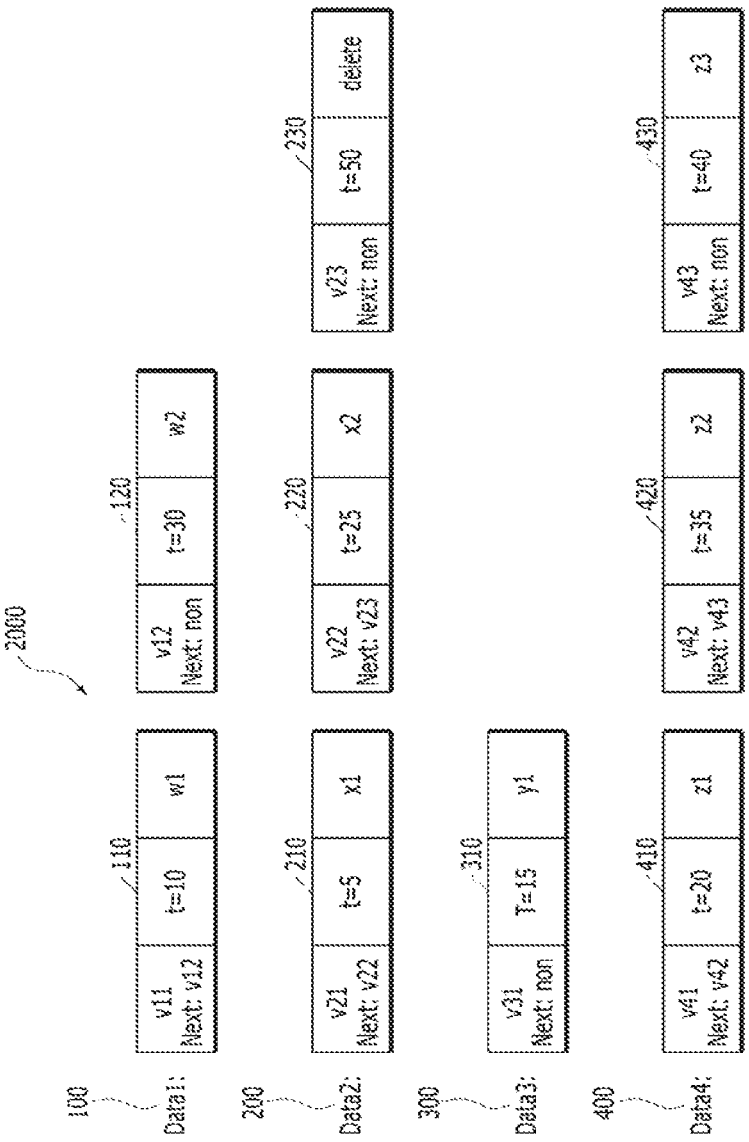
FIG. 3 is a view illustrating an example of a plurality of data including a plurality of versions according to an exemplary embodiment of the present disclosure.

FIG. 3 is a view illustrating an example of a plurality of data including a plurality of versions according to an exemplary embodiment of the present disclosure.

In an example of the plurality of data 2000 of FIG. 3, data 1 100 is inserted as a data value w1 at a time stamp (t=10) (a first version 110 of data 1) and updated to be a data value w2 at a time stamp (t=30) (a second version 120 of data 1). Data 2 200 is inserted as a data value x1 at a time stamp (t=5) (a first version 210 of data 2), updated to be a data value x2 at a time stamp (t=25) (a second version 220 of data 2), and deleted at a time stamp (t=50) (a third version 230 of data 2). Data 3 300 is inserted as a data value y1 at a time stamp (t=15) (a first version 310 of data 3). Further, data 4 400 is inserted as a data value z1 at a time stamp (t=20) (a first version 410 of data 4), updated to be a data value z2 at a time stamp (t=35) (a second version 420 of data 4), and updated to be a data value z3 at a time stamp (t=40) (a third version 430 of data 4). The above description is all examples and the time stamp is represented by numbers for convenience sake but may include an arbitrary structure including a time. Further, the data values included in the data field of individual versions are examples and may include arbitrary data values.

FIG. 4 is a view illustrating an example of a log of the plurality of data including the plurality of versions illustrated in FIG. 3.

The first and second logs 3000 and 4000 may include one or more change information 3010, 3020, 3030, 3040, 3050, 3060, 3070, 3080, 3090, 4010, 4020, and 4030. The change information may include information indicating changes of individual data of the database. Even though in the example of FIG. 4, it is illustrated that the change information 3010, 3020, 3030, 3040, 3050, 3060, 3070, 3080, and 3090 includes only data values of the data, the change information may also include a type (insert, update, and delete) of change and a time stamp and further include arbitrary information related with change of data in the database.

When the data is changed as illustrated in the example of FIG. 3, the first log 3000 may be represented as follows. The change information 3010, 3020, 3030, 3040, 3050, 3060, 3070, 3080, and 3090 may include the data values at a specific time (a time stamp). For example, in the example of FIG. 3, the first version 210 of data 2 has the earliest time stamp among the versions of the data 2000 and thereafter, the first version 110 of data 1, the first version 310 of data 3, the first version 410 of data 4, the second version 220 of data 2, the second version 120 of data 1, the second version 420 of data 4, the third version 430 of data 4, and the third version 230 of data 2 have the time stamps in this order. The log may include changes of the data. In the example of FIG. 3, changes of data 2000 such as insert of data 2 as x1 (the first version 210 of data 2), insert of data 1 as w1 (the first version 110 of data 1), insert of data 3 as y1 (the first version 310 of data 3), insert of data 4 as z1 (the first version 410 of data 4), update of data 2 to be x2 (the second version 220 of data 2), update of data 1 to be w1 (the first version 110 of data 1), update of data 4 to be z2 (the second version 420 of data 4), update of data 4 to be z3 (the third version 430 of data 4), and delete of data 2 (the third version 230 of data 2) are generated. Therefore, since the first log 3000 include the data value at each time point as change information, when the data is changed as illustrated in the example of FIG. 3, the first log 3000 includes change information 1: data 2=x1 (3010), change information 2: data 1=w1 (3020), change information 3: data 3=y1 (3030), change information 4: data 4=z1 (3040), change information 5: data 2=x1 (3050), change information 6: data 1=w2 (3060), change information 7: data 4=z2 (3070), change information 8: data 4=z3 (3080), and change information 9: data 2=delete (3090). The first log file may include the same contents as the first log 3000.

Figure 5:
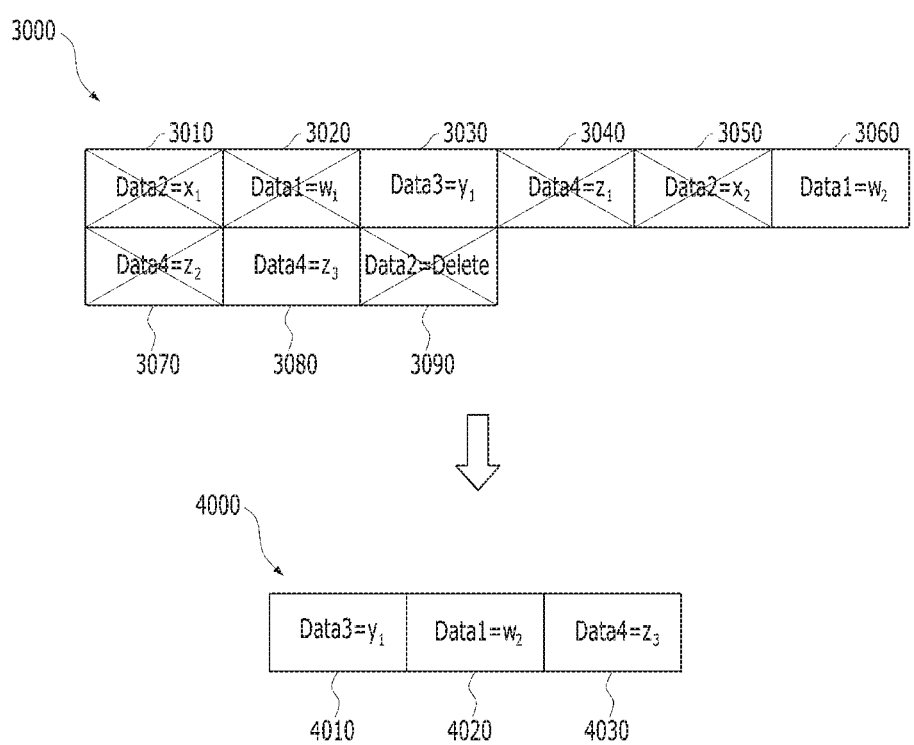
FIG. 5 is a view illustrating an example of log compaction according to an exemplary embodiment of the present disclosure.

FIG. 5 is a view illustrating an example of log compaction according to an exemplary embodiment of the present disclosure.

In order to reduce the size of the log, the log compaction module 1500 performs the log compaction on the first log 3000 to generate the second log 4000 including only effective change information among change information on individual data.

The log compaction module 1500 may generate the second log 4000 configured by the effective change information 4010, 4020, and 4030, among one or more change information 3010, 3020, 3030, 3040, 3050, 3060, 3070, 3080, and 3090 included in the first log 3000.

As an example of a more specific operation, the log compaction module 1500 reads the first log file to identify individual data from the change information. The change information 1 3010 of the first log 3000 includes data 2 (=x1). However, since the third version 230 of data 2 which is the latest version among the plurality of versions of data 2 indicates that data 2 is deleted, the change information 1 3010 of the first log is not the effective change information. Similarly, even though the change information 2 3020 of the first log includes data 1 (=w1), since the second version 120 of the data 1 which is the latest version of data 1 indicates that data 1=w2, the log compaction module 1500 determines that the change information 2 3020 of the first log is not effective change information. The change information 3 3030 of the first log includes data 3 (=y1) and the first version 310 of data 3 which is the latest version of data 3 indicates that data 3=y1, so that the change information 3 3030 of the first log matches the latest version of the identified data (data 3) and thus may be effective change information.

As described above, the log compaction module 1500 may determine effective change information 3030, 3060, and 3080, among the change information 3010, 3020, 3030, 3040, 3050, 3060, 3070, 3080, and 3090 of the first log.

In order to perform the log compaction as described above, the log compaction module 1500 reads all or a part of the first log file and compares the latest version of the data identified by the change information included in the first log file and the change information to determine effective change information.

Further, in order to distribute the disk I/O, the log compaction module 1500 may perform the log compaction only on a part of the first log file. For example, in the above-described example, in order to perform the log compaction on the change information 3010, 3020, 3030, 3040, and 3050 before the time stamp (T=30), the log compaction module 1500 reads only the change information 1 to 5 3010, 3020, 3030, 3040, and 3050 to determine whether the information is the effective change information.

Further, the log compaction module 1500 may generate the second log 4000 including the effective change information 3030, 3060, and 3080. When the log compaction module 1500 simply identifies only the effective change information 3030, 3060, and 3080 and deletes only the change information 3010, 3020, 3040, 3050, 3070, and 3090 which are not effective, the data values are not continuously recorded in a storage space, so that fragmentation may be caused in the main memory 1100 or the permanent storing device 1600. Therefore, the log compaction module 1500 finally generates the second log 4000 only including the effective change information 3030, 3060, and 3080 according to the exemplary embodiment of the present disclosure, so that the change information 4010, 4020, and 4030 included in the second log 4000 on which the log compaction is performed is continuously recorded on the storage space. Accordingly, the fragmentation is not generated.

Figure 6:
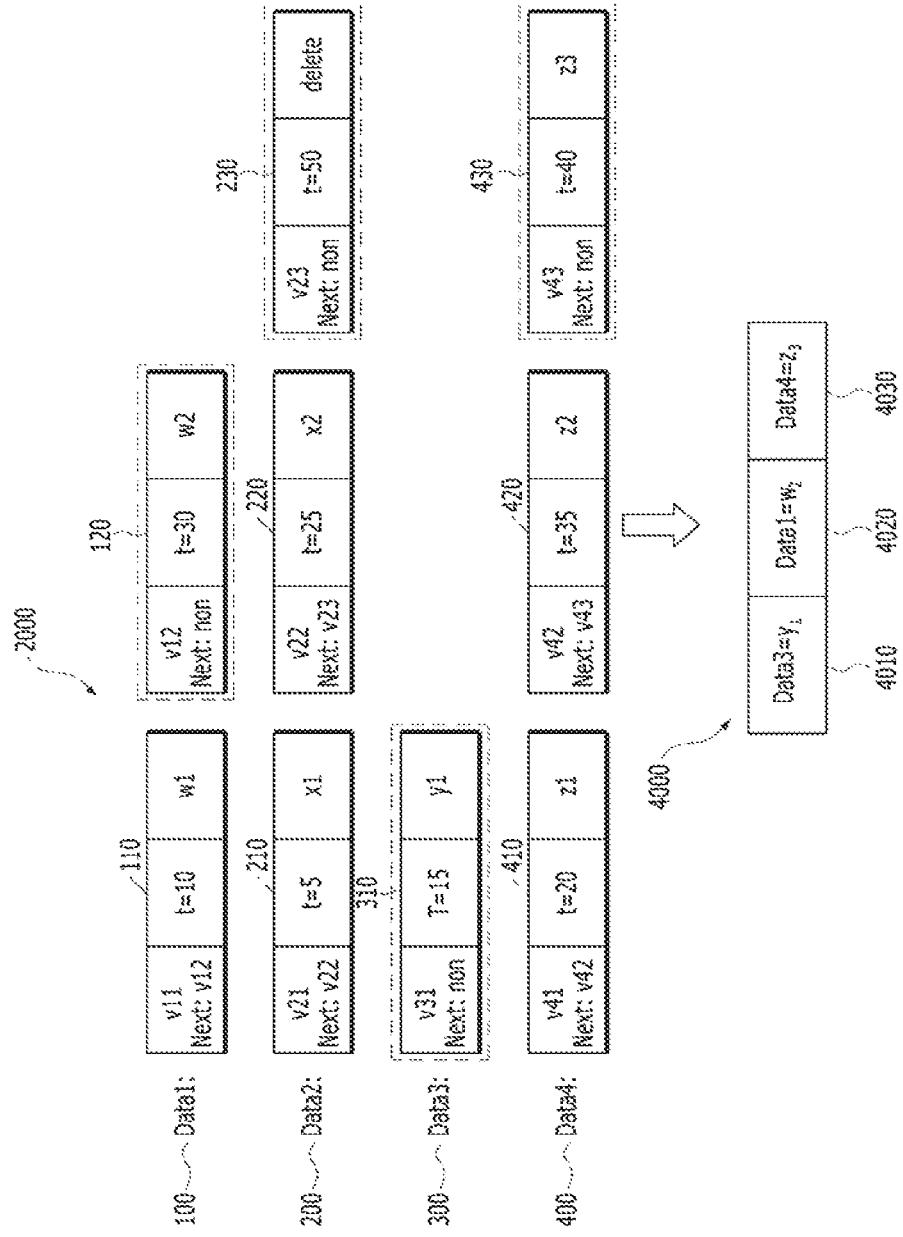
FIG. 6 is a view illustrating an example of log compaction according to an exemplary embodiment of the present disclosure.

FIG. 6 is a view illustrating an example of log compaction according to an exemplary embodiment of the present disclosure.

In another example of the log compaction of FIG. 6, a log compaction module 1500 may read a main memory 1100 without reading a first log file on a permanent storing device 1600 to generate a second log 4000.

The log compaction module 1500 scans the main memory 1100 to identify individual data and reads latest versions of the individual identified data, and generates a second log 4000 including latest versions of the individual data.

More specifically, when the versions of the database are changed as illustrated in the example of FIG. 3, the log compaction module 1500 scans the main memory 1100 to identify the data 1 to data 4 100, 200, 300, and 400. The log compaction module 1500 may generate the second log 4000 including the latest version of the identified data.

In the example of FIG. 6, the log compaction module 1500 may generate a second log 4000 including a second version 120 of data 1 which is the latest version of identified data 1, a first version 310 of data 3 which is the latest version of identified data 3, and a third version 430 of data 4 which is the latest version of identified data 4. In the example of FIG. 6, the third version 230 of data 2 which is the latest version of the identified data 2 indicates that data 2 is deleted, so that the third version 230 of data 2 may not be included in the second log 4000. The log compaction module 1500 may generate the second log 4000 with the identified latest version (the second version 120 of data 1, the first version 310 of data 3, and the third version 430 of data 4) as change information.

Since data 1=w2 (the second version 120 of data 1), data 3=y1 (the first version 310 of data 3), data 4=z3 (the third version 430 of data 4) are effective values in the database, the second log 4000 may include change information 1: data 3=y1 4010, change information 2: data 1=w2 4020, and change information 3: data 4=z3 4030. In this case, the log compaction module 1500 may generate the second log 4000 in the order of the time stamps of the effective versions 120, 310, and 430 of the data or generate the second log (for example, change information 1: data 1=w2 change information 2: data 3=y1, and change information 3: data 4=z3) in the order of position on the main memory of the data 2000.

According to another exemplary embodiment of the present disclosure, the log compaction module 1500 scans only the main memory 1100 to perform the log compaction to reduce the performance lowering due to the I/O with the permanent storing device 1600.

Figure 7:
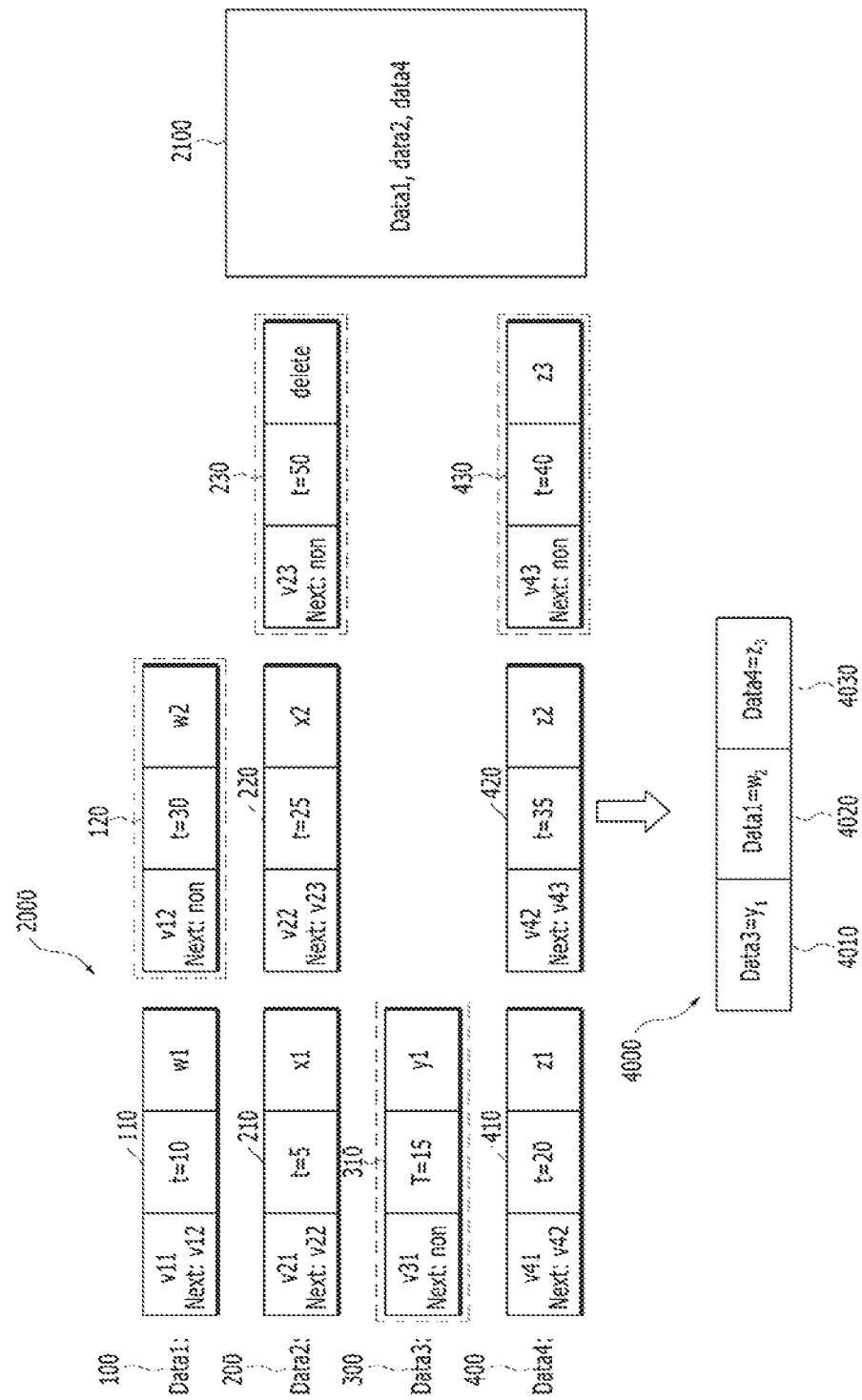
FIG. 7 is a view illustrating an example of log compaction according to an exemplary embodiment of the present disclosure.

FIG. 7 is a view illustrating an example of log compaction according to an exemplary embodiment of the present disclosure.

In another example of the log compaction of FIG. 7, the log compaction module 1500 may read the main memory 1100 without reading the first log file on the permanent storing device 1600 to generate the second log 4000.

The log compaction module 1500 reads the changed data identification information 2100 to identify changed data. The changed data identification information includes information for identifying data which is updated or deleted in the database. In the example of FIG. 7, data 1 100, data 2 200, and data 4 400 are updated or deleted from the database 2000, so that the changed data identification information 2100 may include information for identifying data 1, data 2, and data 4. The log compaction module 1500 reads the changed data identification information 2100 to identify data 1 100, data 2 200, and data 4 400 and generates the second log 4000 which includes the latest versions (the second version 120 of data 1 and the third version 430 of data 4) of data which are not deleted, among the identified data, as change information 4020 and 4030. In this case, since the change information included in the first log 3000 is the effective change information, the log compaction module 1500 may determine that change information (change information 3030 on data 3) on data which is not included in the changed data identification information 2100, among the change information of the first log 3000 may not be deleted.

Therefore, since the change information (change information 3010, 3020, 3040, 3050, 3060, 3070, 3080, and 3090 for data 1, 2, and 4) on data included in the changed data identification information 2100 among the change information of the first log 3000 may not be effective, the log compaction module 1500 may determine whether to be effective change information by referring to versions 2000 of the data. Further, the log compaction module 1500 may determine that the change information (change information 3030 on data 3) on data which is not included in the changed data identification information 2100 among the change information of the first log 3000 is effective change data, not to delete the change information when the second log 4000 is generated.

Further, the log compaction module 1500 may generate the second log 4000 including the effective change information 4010, 4020, and 4030. Since data 1=w2 (the second version 120 of data 1), data 3=y1 (the first version 310 of data 3), data 4=z3 (the third version 430 of data 4) are effective values in the database, the second log 4000 may include change information 1: data 3=y1 4010, change information 2: data 1=w2 4020, and change information 3: data 4=z3 4030. In this case, the log compaction module 1500 may generate the second log 4000 in the order of the time stamps of the effective versions 120, 310, and 430 of the data or generate the second log (for example, change information 1: data 1=w2, change information 2: data 3=y1, and change information 3: data 4=z3) in the order of position on the main memory of the data 2000.

Figure 8:
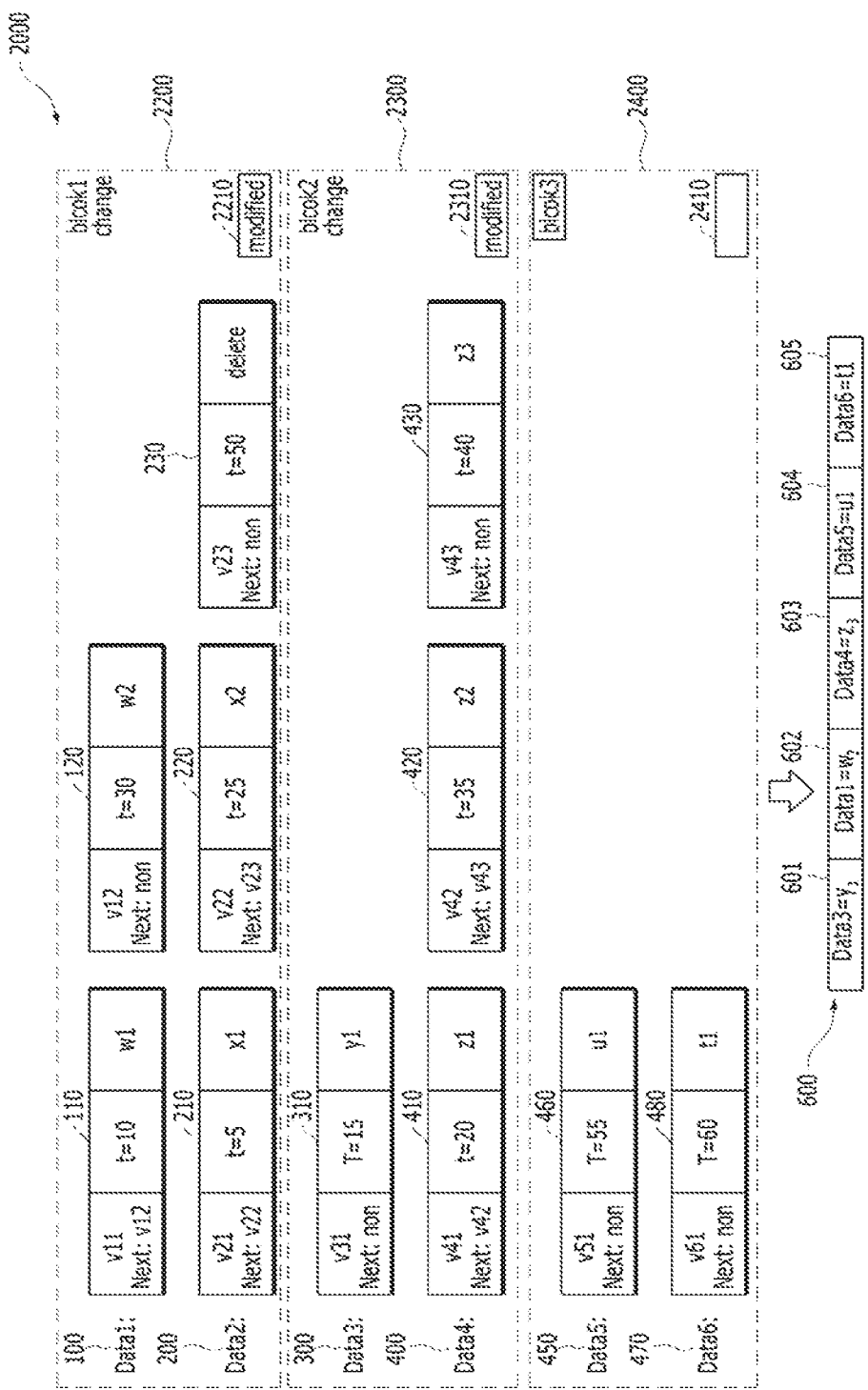
FIG. 8 is a view illustrating an example of log compaction according to an exemplary embodiment of the present disclosure.

FIG. 8 is a view illustrating an example of log compaction according to an exemplary embodiment of the present disclosure.

In another example of the log compaction of FIG. 8, the log compaction module 1500 may read the main memory 1100 without reading the first log file on the permanent storing device 1600 to generate the second log 4000.

When the data 2000 is changed as illustrated in an example of FIG. 8, the first log 3000 includes change information 1: data 2=x1 (3010), change information 2: data 1=w1 (3020), change information 3: data 3=y1 (3030), change information 4: data 4=z1 (3040), change information 5: data 2=x1 (3050), change information 6: data 1=w2 (3060), change information 7: data 4=z2 (3070), change information 8: data 4=z3 (3080), change information 9: data 2=delete (3090), change data 10: data 5=u1, and change information 11: data 6=t1.

The log compaction module 1500 scans the block header of individual data blocks 2200, 2300, and 2400 of the main memory 1100 to read the block data change information 2210, 2310, and 2410 to determine whether the block data change information 2210, 2310, and 2410 indicate that the data included in the data blocks 2200, 2300, and 2400 is changed.

When the block data change information 2210, 2310, and 2410 indicate the change of data included in the data block, the log compaction module 1500 scans only the data block to identify the changed data. In the example of FIG. 8, data 1, 2, 3, and 4 100, 200, 300, and 400 included in the data blocks 1 and 2 2200 and 2300 are modified, so that the block data change information 2210 of data block 1 and the block data change information 2310 of data block 2 may indicate that the data included in each data block is modified. However, data 5 and 6 500 and 600 included in data block 3 2400 are not modified after being inserted, so that the block data change information 2410 of data block 3 may indicate that the data (data 5 and 6 500 and 600) included in the data block 3 is not updated or deleted.

Therefore, the log compaction module 1500 scans data block 1 2200 and data block 2 2300 to identify changed data and reads the undeleted latest version (the second version 120 of data 1, the first version 310 of data 3, and the third version 430 of data 4) of the identified data. The log compaction module 1500 may generate the second log 4000 based on the latest version of the read data. In this case, since the change information included in the first log 3000 is effective information, the log compaction module 1500 may determine that the change information on data (data 5 and 6 500 and 600) included in the data block 2400 in which the block data change information 2410 which does not represent that the data of the data block is changed, among the change information of the first log 3000, is recorded may not be deleted.

Therefore, since the change information on the data (data 1, 2, 3, and 4 100, 200, 300, and 400) included in the data blocks 2200 and 2300 in which block data change information 2210 and 2310 indicating that the data of the block is changed is recorded, among the change information of the first log 3000 may not be effective, the log compaction module 1500 may determine whether the change information is effective change information by referring to the versions 2000 of data.

The log compaction module 1500 may generate the second log 4000 including the above-described effective change information 4010, 4020, 4030, 4040, and 4050. Since data 1=w2 (the second version 120 of data 1), data 3=y1 (the first version 310 of data 3), data 4=z3 (the third version 430 of data 4), data 5=u1 (the first version 510 of data 5), data 6=t1 (the first version 610 of data 6) are effective values in the database, the second log 4000 may include change information 1: data 3=y1 4010, change information 2: data 1=w2 4020, change information 3: data 4=z3 4030, change information 4: data 5=u1 4040, and change information 5: data 6=t1 4050. In this case, the log compaction module 1500 may generate the second log 4000 in the order of the time stamps of the effective versions 120, 310, 430, 510, and 610 of the data or generate the second log (for example, change information 1: data 1=w2, change information 2: data 3=y1, 4020, change information 3: data 4=z3, change information 4: data 5=u1, and change information 5: data 6=t1) in the order of position on the main memory of the data 2000.

Figure 9:
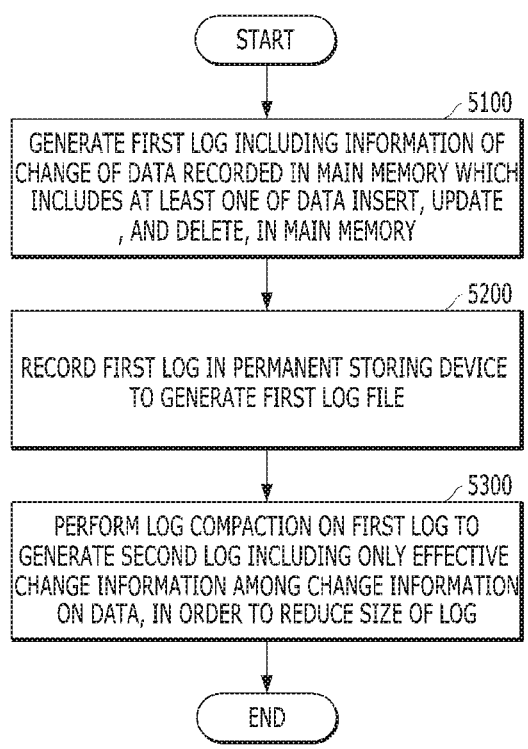
FIG. 9 is a flowchart illustrating a management method of a main memory database according to an exemplary embodiment of the present disclosure.

FIG. 9 is a flowchart illustrating a management method of a main memory database according to an exemplary embodiment of the present disclosure.

A management method of a main memory database according to an exemplary embodiment of the present disclosure may be performed in a computing apparatus 1000 including one or more processors and a main memory which stores commands executable in the processors.

A log generating module 1200 generates a first log 3000 including change information for data recorded in a main memory 1100 in the main memory 1100 in step S100. The change information may include information indicating change of the data of the database and each change may include at least one of data insert, update, and delete.

A log file generating module 1300 records the first log in a permanent storing device 1600 to generate a first log file in step S200.

In order to reduce the size of the log, a log compaction module 1500 performs log compaction on the first log 3000 to generate the second log including only effective change information among change information on individual data in step S300.

When the log compaction is performed in the database of the related art, invalid change information is deleted from the existing log, so that an empty space is generated in the log, which may cause fragmentation of the main memory or the permanent storing device. However, the log compaction is performed according to an exemplary embodiment of the present disclosure, a log including only the effective changed information is newly generated, so that the fragmentation problem is not caused, thereby improving a performance. Further, when the log compaction is performed according to an exemplary embodiment of the present disclosure, the log compaction is divided to be performed, so that the performance lowering of the database at the time of log compaction may be minimized.

Figure 10:
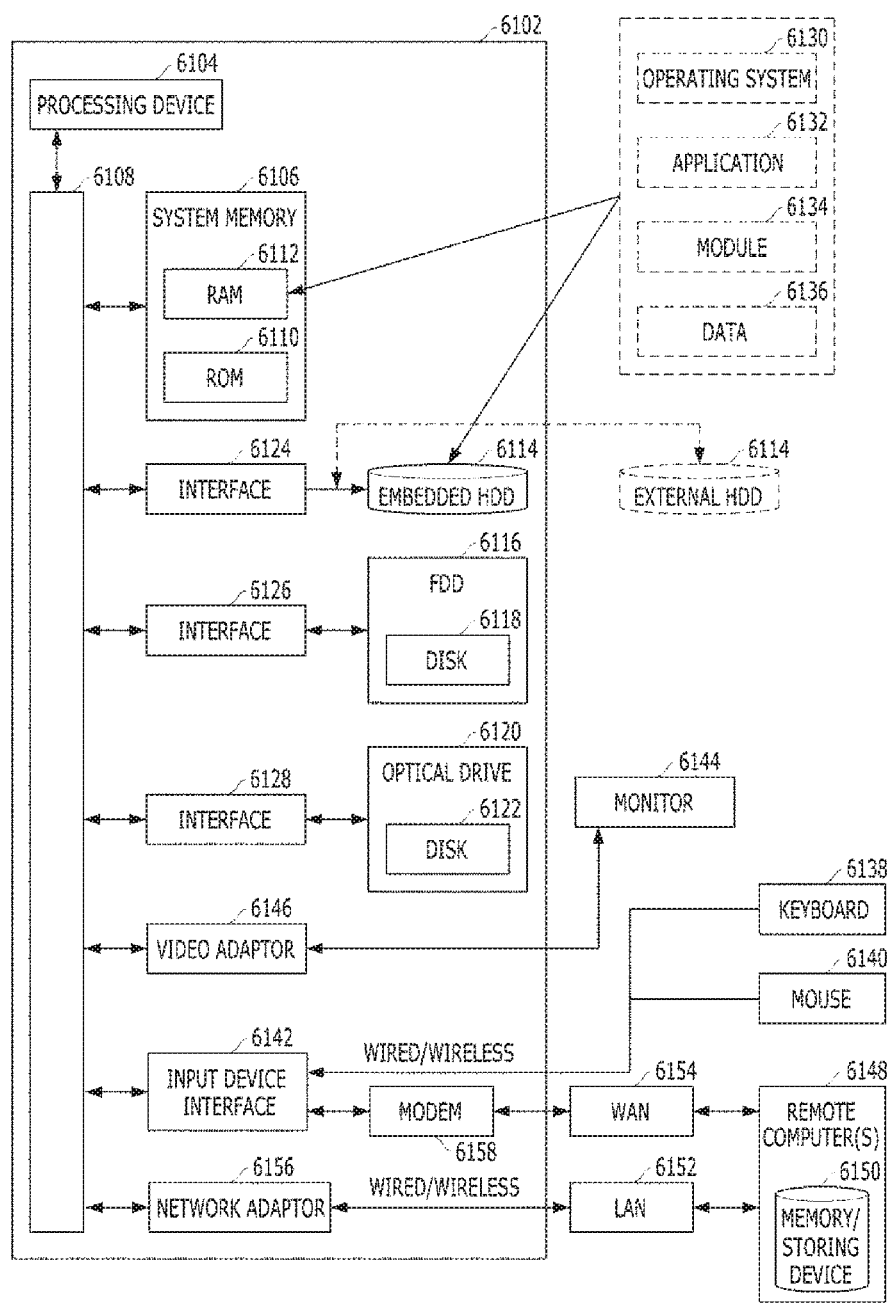
FIG. 10 illustrates a simple and general schematic view of an exemplary computing environment in which exemplary embodiments of the present disclosure are embodied.

FIG. 10 illustrates a simple and general schematic view of an exemplary computing environment in which exemplary embodiments of the present disclosure are embodied.

Even though the present disclosure is generally described in regard to a computer executable instruction which may be executed in one or more computers, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present disclosure may be embodied not only by a single processor or a multi-processor computer system, a mini computer, and a main frame computer, but also a personal computer, a hand-held computing apparatus, microprocessor based or programmable home appliances (which may be connected to one or more related devices to be operated), and other computer system configurations.

The described exemplary embodiments of the present disclosure may be further embodied in a distributed computing environment in which some tasks are performed by remote processing devices which are connected to each other through a communication network. In the distributed computing environment, a program module may be located in both local and remote memory storing devices.

Generally, a computer includes various computer readable media. If a medium is accessible by the computer, the medium may be a computer readable medium and the computer readable medium includes a volatile or non-volatile medium, a transitory or non-transitory medium, and a mobile or non-mobile medium. As an example which is not limitation, the computer readable medium may include a computer storage medium and a communication medium. The computer storage medium includes a volatile or non-volatile medium, a transitory or non-transitory medium, and a mobile or non-mobile medium which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and is used to store desired information, but is not limited thereto.

The communication medium generally implements a computer readable instruction, a data structure, a program module, or other data in a modulated data signal such as a carrier wave or other transport mechanisms and includes all information transfer media. The term modulated data signal refers to a signal in which one or more of the properties of the signal are set or changed to encode information in the signal. As an example which is not limitation, the communication medium includes a wired medium such as a wired network or direct wired connection and a wireless medium such as sound, RF, infrared ray, or another wireless medium. It is considered that a combination of any of the above-mentioned media may also be included in the scope of the computer readable medium.

An exemplary environment 6100 including a computer 6102 which implements various aspects of the present disclosure is illustrated and the computer 6102 includes a processing device 6104, a system memory 6106, and a system bus 6108. The system bus 6108 connects system components including a system memory 6106 (not to be limited thereto) to the processing device 6104. The processing device 6104 may be an arbitrary processor among various commercial processors. A dual processor and other multiprocessor architectures may also be used as the processing device 6104.

The system bus 6108 may be any of several types of bus structures which is additionally connected to a local bus which uses any of a memory bus, a peripheral device bus, and various commercial bus architectures. The system memory 6106 includes a read only memory (ROM) 6110 and a random access memory RAM 6112. A basic input/output system (BIOS) is stored in a non-volatile memory 6110 such as a ROM, an EPROM, and an EEPROM and the BIOS includes a basic routine which assists to transmit information between components in the computer 6102 while the computer is activated. The RAM 6112 may further include a fast RAM such as a static RAM for caching data.

The computer 6102 further includes an embedded hard disk drive (HDD) 6114 (for example, EIDE, SATA) which may also be configured as an external disk in an appropriate chassis (not illustrated), a magnetic floppy disk drive (FDD) 6116 (for example, to read data from a portable diskette 6118 or record data therein), and an optical disk driver 6120 (for example, to read a CD-ROM disk 6122 or read data from other high quantity optical media such as a DVD or record data therein). The hard disk drive 6114, the magnetic disk drive 6116, the optical disk drive 6120 may be connected to the system bus 6108 through a hard disk drive interface 6124, a magnetic disk drive interface 6126, and an optical drive interface 6128. The interface 6124 for implementing an external drive may include at least one or both of universal serial bus (USB) and IEEE 1394 interface technique.

These drives and a computer readable medium related therewith provide non-volatile storage of data, a data structure, a computer executable instruction, or the like. In the case of the computer 6102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other types of computer readable medium such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 6130, one or more application programs 6132, other program modules 6134, and program data 6136 may be stored in the drive and the RAM 6112. The operating system, the application, module and/or all or a part of data are also cached by the RAM 6112. It is obvious that the present disclosure may be implemented by various commercially applicable operating systems or a combination of operating systems.

A user may input a command and information to the computer 6102 through one or more wired/wireless input devices, for example, a pointing device such as a keyboard 6138 and a mouse 6140. Other input devices (not illustrated) may include a microphone, an IR remote controller, a joystick, a game pad, a stylus pen, a touch screen, or the like. These and other input devices are sometimes connected to the processing device 6104 through an input device interface 6142 which is connected to the system bus 6108, but may be connected by a parallel port, an IEEE 1394 serial port, a game port, a USB port, an IR interface, or other interfaces.

A monitor 6144 or other type of display device is also connected to the system bus 6108 through an interface such as a video adaptor 6146. In addition to the monitor 6144, a computer generally includes other peripheral output devices (not illustrated) such as a speaker or a printer.

The computer 6102 may operate in a networked environment using logical connection of remote computer(s) 6148 to one or more remote computers through wired and/or wireless communication. The remote computer(s) 6148 may be a workstation, a server computer, a router, a personal computer, a portable computer, a microprocessor based amusement machine, a peer device, or other general network nodes and generally, includes a large number of or all the components which have been described for the computer 6102. However, for the purpose of simplicity, only a memory storing device 6150 is illustrated. The illustrated logical connection includes wired/wireless connection to a local area network (LAN) 6152 and/or larger network, for example, a wide area network (WAN) 6154. The LAN and WAN networking environments are general in an office and a company and facilitate enterprise-wide computer network such as intranet and these are all connected to a worldwide computer network, for example, Internet.

When the computer is used in the LAN networking environment, the computer 6102 is connected to a local network 6152 through a wired and/or wireless communication network interface or an adaptor 6156. The adaptor 6156 facilitates wired or wireless communication to the LAN 6152 and the LAN 6152 also includes a wireless access point provided therein to communicate with the wireless adaptor 6156. When the computer is used in the WAN networking environment, the computer 6102 has other means, for example, includes a modem 6158 or is connected to a communication server on the WAN 6154, or uses Internet to set communication through the WAN 6154. The modem 6158 which may be an embedded or external, and wired or wireless device is connected to the system bus 6108 through the serial port interface 6142. In a networked environment, program modules described for the computer 6102 or a part thereof may be stored in the remote memory/storing device 6150. It is understood that the illustrated network connection is an example and other means to set a communication link between computers may be used.

The computer 6102 performs operations to communicate with an arbitrary wireless device or entity which is disposed through a wireless communication to operate, for example, a printer, a scanner, a desktop and/or portable computer, a portable data assistant (PDA), a communication satellite, arbitrary equipment or location related with a wireless detectable tag, and a telephone. This includes at least a Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a, b, g, or the like) to provide safe, reliable, and fast wireless connection. Wi-Fi is used to connect computers to each other or to the Internet, and a wired network (IEEE 802.3 or Ethernet is used). The Wi-Fi network operates at a 11 Mbps (802.11a) or 54 Mbps (802.11b) data rate in an unauthorized wireless band of 2.4 and 5 GHz or operates in a product including both bands (dual band).

Those skilled in the art may understand that information and signals may be represented using various arbitrary technologies and techniques. For example, data, indications, commands, information, signals, bits, symbols, and chips which may be referred in the above description may be represented by voltages, currents, electromagnetic waves, magnetic fields or particles, optical fields or particles, or an arbitrary combination thereof.

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software"), a design code, or a combination thoseof. In order to clearly describe compatibility of hardware and software, various exemplary components, blocks, modules, circuits, and steps are generally described above with respect to functions thoseof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present disclosure.

Various exemplary embodiments suggested herein may be implemented by a method, a device, or a standard programming and/or an article using an engineering technique. The term "article" includes a computer program which is accessible from an arbitrary computer readable device, a carrier or a medium. For example, the computer readable medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. Further, various storage media suggested herein include one or more devices for storing information and/or other machine readable media. The term "machine readable medium" includes a wireless channel which stores, contains, and/or transmits command(s) and/or data and various other media, but is not limited thereto.

It should be understood that a specific order or a hierarchical structure of steps in suggested processes is examples of exemplary approaches. It should be understood, based on a design priority, that a specific order or a hierarchical structure of steps in the processes may be rearranged within the scope of the present disclosure. The accompanying method claims provide elements of various steps in the order of sample, but the claims are not meant to be limited to the suggested specific order or hierarchical structure.

Description of the suggested exemplary embodiments is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but interpreted in the broadest range which is consistent with principles suggested herein and new features.

What is claimed is:

1. A management method of a main memory database which is performed in a computing apparatus including one or more processors and a main memory, which stores commands executable in the processors, the method comprising:
   generating in the main memory a first log which is a target of the log compaction including collected change information of each change when the change occurs, which includes at least one of a data insertion, an update, and a deletion of data recorded in the main memory by one of the processors;

recording the first log which is a target of the log compaction in the main memory in a permanent storing device to generate a first log file by one of the processors; and performing log compaction which leaves only effective change information among change information of the data included in the log on the first log to generate a second log including only effective change information among change information on individual data in order to reduce the size of the log by one of the processors, wherein the data is configured by one or more versions which are connected by a link and generate a version chain, based on a modified time sequence, wherein the version chain is connected with a link which connects a next version and a previous version based on a version identification information, in order to read a data corresponding to a transaction in accordance with the link of the version chain of the data when reading a data recorded in the database, wherein the version includes a header and a data field, wherein the header includes at least one of a flag which indicates a usage state of the version or whether the version is deleted, the version identification information which includes information for identifying a version, a time stamp which includes information about time of a transaction related with the version, and data identification information which includes identification information indicating whether a value recorded in the data field is located in a specific column and row of the data table of the database, wherein the version identification information includes information of an address value on a main memory of a next version of the data, in order to link with the next version, wherein the data field includes a data value.

2. The method of claim 1, further comprising:

determining whether a predetermined condition is satisfied to perform log compaction which leaves only effective change information among change information of the data included in the log in order to reduce a size of the log by one or more processors;

wherein the predetermined condition includes at least one of whether a user request is received, whether a predetermined period has elapsed, whether the size of the log file is equal to or larger than a predetermined size, and whether a usage amount of the processor is equal to or lower than a predetermined usage amount.

3. The method of claim 1, wherein the permanent storing device of the main memory database includes a log file which is a log stored in the permanent storing device wherein the log is generated on the main memory, but does not include a data file, wherein the database on the main memory is stored in the permanent storing device.

4. The method of claim 1, further comprising:

recording the second log in the permanent storing device to generate a generated second log file which includes only effective change information among change information of the data included in the log by log compaction which leaves only effective change information among change information of the data included in the log in order to reduce the size of the log by one or more processors; and deleting the first log file which is generated by recording the first log which is a target of the log compaction in the main memory in the permanent storing device by one or more processors from the permanent storing device by one or more processors.

5. The method of claim 1, wherein the performing of log compaction which leaves only effective change information among change information of the data included on the first log to generate the second log including only effective change information among change information on individual data in order to reduce the size of the log by one or more processors includes:

reading change information of the first log file to identify data by one or more processors; and determining that change information which matches the latest version of the identified data among the change information on the identified data in the first log file as the effective change information by one or more processors.

6. The method of claim 5, wherein the reading of change information of the first log file to identify data by one or more processors includes:

identifying data corresponding to change information of a predetermined time limit among the change information included in the first log file by one or more processors.

7. The method of claim 1, wherein the performing of log compaction which leaves only effective change information among change information of the data included in the log on the first log to generate the second log including only effective change information among change information on individual data in order to reduce the size of the log by one or more processors includes:

comparing the time stamp of the change information and the time stamp of the latest version of the data to determine the change information having a time stamp earlier than the time stamp of the latest version of the data as invalid change information by one or more processors; and comparing the time stamp of the change information and the time stamp of the latest version of the data to determine the change information having a time stamp after the time stamp of the latest version of the data as effective change information by one or more processors.

8. The method of claim 1, wherein the performing of log compaction which leaves only effective change information among change information of the data included in the log on the first log to generate the second log including only effective change information among change information on individual data included by one or more processors:

scanning the main memory to identify the data by one or more processors;

reading a latest version of the identified data by one or more processors; and generating the second log including the latest version of the data by one or more processors.

9. The method of claim 1, further comprising:

generating changed data identification information including information for identifying changed data when data is changed in the database by one or more processors, wherein the performing of log compaction which leaves only effective change information among change information of the data included in the log on the first log to generate the second log including only effective change information among change information on individual data in order to reduce the size of the log by one or more processors includes:

scanning the changed data identification information which includes information for identifying which data is changed in the database to identify changed data by one or more processors;

reading a latest version of the identified data by one or more processors; and generating the second log including the latest version of the data by one or more processors.

10. The method of claim 1, further comprising:

generating block data change information which identifies changed data when the data is changed in a data block header of the main memory, in which the main memory includes two or more data blocks by one or more processors;

wherein the performing of log compaction which leaves only effective change information among change information of the data included in the log on the first log to generate the second log including only effective change information among change information on individual data in order to reduce the size of the log by one or more processors includes:

scanning each data block header of the main memory to read block data change information and determine whether the block data change information indicates the change of data included in each data block by one or more processors;

scanning the data block to identify changed data when the block data change information indicates change of data included in the data block as a result of determination by one or more processors;

reading a latest version of the identified data by one or more processors; and generating the second log including the latest version of the data by one or more processors.

11. A computing apparatus including a main memory database, the computing apparatus comprising:

one or more processors;

a main memory that is configured to store commands executable by one or more processors;

wherein the one or more processors are configured to process at least instructions from a log generating module, a log file generating module, and a log compaction module;

where the log generating module is configured to generate in the main memory a first log which is a target of the log compaction including information of change, which includes at least one of a data insertion, an update, and a deletion of data recorded in the main memory;

where the log file generating module is configured to record the first log which is a target of the log compaction in the main memory in a permanent storing device to generate a first log file; and where the log compaction module is configured to perform log compaction which leaves only effective change information among change information of the data included in the log on the first log to generate a second log including only effective change information among change information on data in order to reduce a size of the log wherein the data is configured by one or more versions which are connected by a link and generate a version chain, based on a modified time sequence, wherein the version chain is connected with a link which connects a next version and a previous version based on a version identification information, in order to read a data corresponding to a transaction in accordance with the link of the version chain of the data when reading a data recorded in the database, wherein the version includes a header and a data field, wherein the header includes at least one of a flag which indicates a usage state of the version or whether the version is deleted, version identification information which includes information for identifying a version, a time stamp which includes information about time of a transaction related with the version, and data identification information which includes identification information indicating whether a value recorded in the data field is located in a specific column and row of the data table of the database, wherein the version identification information includes information of an address value on a main memory of a next version of the data, in order to link with the next version, wherein the data field includes a data value.

12. A computer program stored in a non-transitory computer readable medium, including a plurality of commands executed by one or more processors, the computer program comprising:

a first command for generates in the main memory a first log which is a target of the log compaction including information of change, which includes at least one of a data insertion, an update, and a deletion of data recorded in the main memory, where the first command is stored in the non-transitory computer readable medium and executed by the one or more processors;

a second command for recording the first log which is a target of the log compaction in the main memory in a permanent storing device to generate a first log file, where the second command is stored in the non-transitory computer readable medium and executed by the one or more processors; and a third command for performing log compaction which leaves only effective change information among change information of the data included in the log on the first log to generate a second log including only effective change information among change information on data in order to reduce a size of the log, where the third command is stored in the non-transitory computer readable medium and executed by the one or more processors wherein the data is configured by one or more versions which are connected by a link and generate a version chain, based on a modified time sequence, wherein the version chain is connected with a link which connects a next version and a previous version based on a version identification information, in order to read a data corresponding to a transaction in accordance with the link of the version chain of the data when reading a data recorded in the database, wherein the version includes a header and a data field, wherein the header includes at least one of a flag which indicates a usage state of the version or whether the version is deleted, version identification information which includes information for identifying a version, a time stamp which includes information about time of a transaction related with the version, and data identification information which includes identification information indicating whether a value recorded in the data field is located in a specific column and row of the data table of the database, wherein the version identification information includes information of an address value on a main memory of a next version of the data, in order to link with the next version,
wherein the data field includes a data value.

* * * * *